(12) United States Patent
Bates et al.

(10) Patent No.: US 6,218,616 B1
(45) Date of Patent: Apr. 17, 2001

(54) ELECTRIC SWITCH PLATE COVER

(76) Inventors: Christopher D. Bates; Patti L. Bates, both of 319 Cypress, Alvin, TX (US) 77511

( * ) Notice: Subject to any disclaimer, the term of this patent is extended or adjusted under 35 U.S.C. 154(b) by 0 days.

(21) Appl. No.: 09/352,834

(22) Filed: Jul. 13, 1999

(51) Int. Cl.[7] .................................................. H02G 3/14
(52) U.S. Cl. .............................. 174/66; 174/67; 220/241
(58) Field of Search ....................... 174/66, 67; 220/241, 220/242, 3.8; D8/353; D13/177

(56) References Cited

U.S. PATENT DOCUMENTS

| | | | |
|---|---|---|---|
| 2,880,264 | * 3/1959 | Ruskin | 174/67 |
| 3,200,989 | 8/1965 | Hubbell | 220/24.3 |
| 3,953,933 | * 5/1976 | Goldstein | 40/462.02 |
| 4,293,173 | * 10/1981 | Tricca | 174/67 X |
| 4,312,458 | * 1/1982 | Stewart | 174/66 |
| 4,469,238 | 9/1984 | Ranalli | 220/254 |
| 4,479,317 | * 10/1984 | Hanna | 174/66 X |
| 4,914,265 | 4/1990 | Mongeau | 200/330 |
| 5,077,452 | 12/1991 | Mathers et al. | 200/43.01 |
| 5,180,886 | * 1/1993 | Dierenbach et al. | 174/66 |
| 5,189,259 | * 2/1993 | Carson et al. | 174/66 |
| 5,456,373 | * 10/1995 | Ford | 220/242 |
| 5,571,995 | 11/1996 | Pierce | 174/67 |
| 5,998,747 | * 12/1999 | Kelso et al. | 200/331 |
| 6,037,542 | * 3/2000 | McCall | 174/66 |
| 6,087,588 | * 7/2000 | Soules | 174/66 |
| 6,091,037 | * 7/2000 | Bachschmid | 200/551 |

* cited by examiner

Primary Examiner—Dean A. Reichard
Assistant Examiner—Dhiru R. Patel
(74) Attorney, Agent, or Firm—Joseph N. Breaux

(57) ABSTRACT

An electric switch plate cover that is easily installed over an existing electrical switch plate and that includes a hinged cover structure that can be locked in a position blocking access to the electric toggle switch of the existing electrical switch plate. The hinged cover structure includes rope loop passage slot positioned to be in registration with a flexible wire rope loop extending from the base plate whereby the flexible wire rope loop is deformably squeezed through the rope loop passage slot.

1 Claim, 3 Drawing Sheets

ELECTRIC SWITCH PLATE COVER

TECHNICAL FIELD

The present invention relates to safety covers for electrical switches and more particularly to an electric switch plate cover for use with a representative switch plate; the electrical switch plate cover including a base plate having a central, rectangular shaped, on/off toggle switch opening; a pair of switch plate cover securing screw apertures positioned so as to be positioned in registration with securing screw apertures of the representative switch plate; a flexible wire rope loop extending upward from the base plate from a location adjacent to the on/off toggle switch opening; a hinged cover structure pivotally attached to the top surface of the base plate and sized and shaped to pivot down over and cover the toggle switch opening and the pair of switch plate cover securing screw apertures of the base plate and having a rope loop passage slot positioned to be in registration with the wire rope loop when the hinged cover structure is in the down position and sized such that the top end of the flexible wire rope loop must deform to slip therethrough; the top end of the flexible wire rope loop defining a lock shank opening through which the shank of a padlock of the like can be positioned to lock the hinged cover structure in the down position when the flexible wire rope loop is deformably squeezed through the rope loop passage slot; the base plate having an underside surface defined by a downwardly extending perimeter base plate edge; the underside surface having a pair of switch plate cover securing screw aperture tubes extending downward from the underside surface of the base plate such that the terminal tube ends thereof lie in the same plane as the downwardly extending perimeter base plate edge; the base plate further including a rigid metal attachment plate attached to the underside surface and having two wire rope end apertures formed therethrough through which two terminal ends of the flexible wire rope loop are positioned; the two terminal ends of the flexible wire rope loop each have a clip secured thereto to prevent the wire rope end from pulling through a respective wire rope end aperture.

BACKGROUND ART

It is often desirable to place an electric toggle switch in either an "on" or an "off" position and then to secure the toggle switch in that position to prevent accidents and the like. It would be a benefit, therefore, to have an electric switch plate cover that could be easily installed over an existing electrical switch plate that provided a hinged cover structure that could be locked in a position blocking access to the electric toggle switch.

GENERAL SUMMARY DISCUSSION OF INVENTION

It is thus an object of the invention to provide an electric switch plate cover that is easily installed over an existing electrical switch plate that includes a hinged cover structure that can be locked in a position blocking access to the electric toggle switch of the existing electrical switch plate.

It is a further object of the invention to provide an electric switch plate cover that includes a base plate having a central, rectangular shaped, on/off toggle switch opening; a pair of switch plate cover securing screw apertures positioned so as to be positioned in registration with securing screw apertures of the representative switch plate; a flexible wire rope loop extending upward from the base plate from a location adjacent to the on/off toggle switch opening; a hinged cover structure pivotally attached to the top surface of the base plate and sized and shaped to pivot down over and cover the toggle switch opening and the pair of switch plate cover securing screw apertures of the base plate and having a rope loop passage slot positioned to be in registration with the wire rope loop when the hinged cover structure is in the down position and sized such that the top end of the flexible wire rope loop must deform to slip therethrough; the top end of the flexible wire rope loop defining a lock shank opening through which the shank of a padlock of the like can be positioned to lock the hinged cover structure in the down position when the flexible wire rope loop is deformably squeezed through the rope loop passage slot; the base plate having an underside surface defined by a downwardly extending perimeter base plate edge; the underside surface having a pair of switch plate cover securing screw aperture tubes extending downward from the underside surface of the base plate such that the terminal tube ends thereof lie in the same plane as the downwardly extending perimeter base plate edge; the base plate further including a rigid metal attachment plate attached to the underside surface and having two wire rope end apertures formed therethrough through which two terminal ends of the flexible wire rope loop are positioned; the two terminal ends of the flexible wire rope loop each have a clip secured thereto to prevent the wire rope end from pulling through a respective wire rope end aperture.

It is a still further object of the invention to provide an electric switch plate cover that includes It is a still further object of the invention to provide an electric switch plate cover that includes It is a still further object of the invention to provide an electric switch plate cover that accomplishes all or some of the above objects in combination.

Accordingly, an electric switch plate cover is provided. The electric switch plate cover includes

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
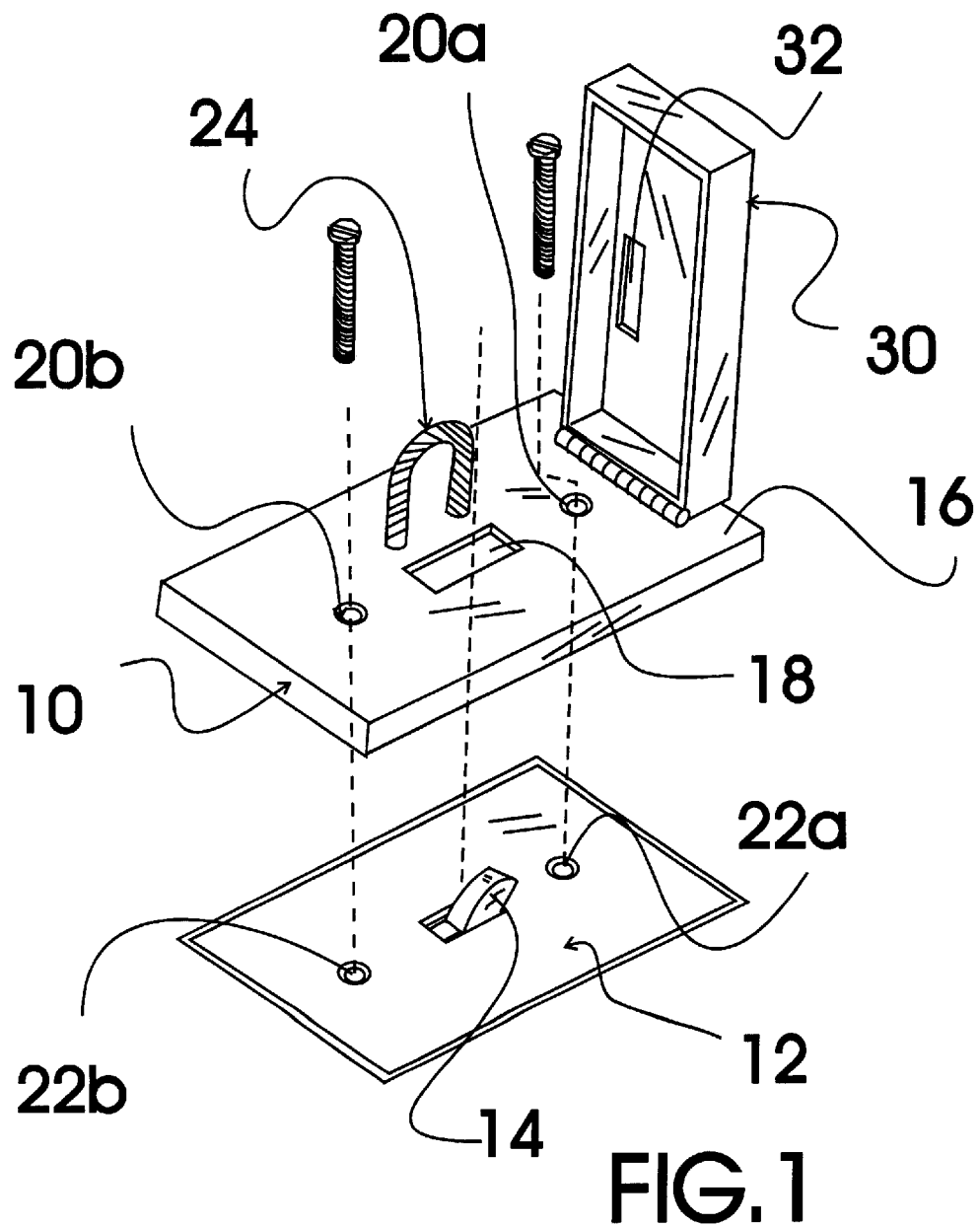
FIG. 1 is a perspective view of an exemplary embodiment of the electric switch plate cover of the present invention positioned above a representative switch plate with a conventional on/off toggle switch; the electric switch plate cover including a base plate having a central, rectangular shaped, on/off toggle switch opening; a pair of switch plate cover securing screw apertures positioned so as to be positioned in registration with the securing screw apertures of the representative switch plate; a flexible wire rope loop extending upward from the base plate from a location adjacent to the on/off toggle switch opening; a hinged cover structure pivotally attached to the top surface of the base plate and sized and shaped to pivot down over and cover the toggle switch opening and the pair of switch plate cover securing screw apertures of the base plate and having a rope loop passage slot positioned to be in registration with the wire rope loop when the hinged cover structure is in the down position and sized to require the top end of the wire rope loop to deformably slip therethrough.
Figure 2:
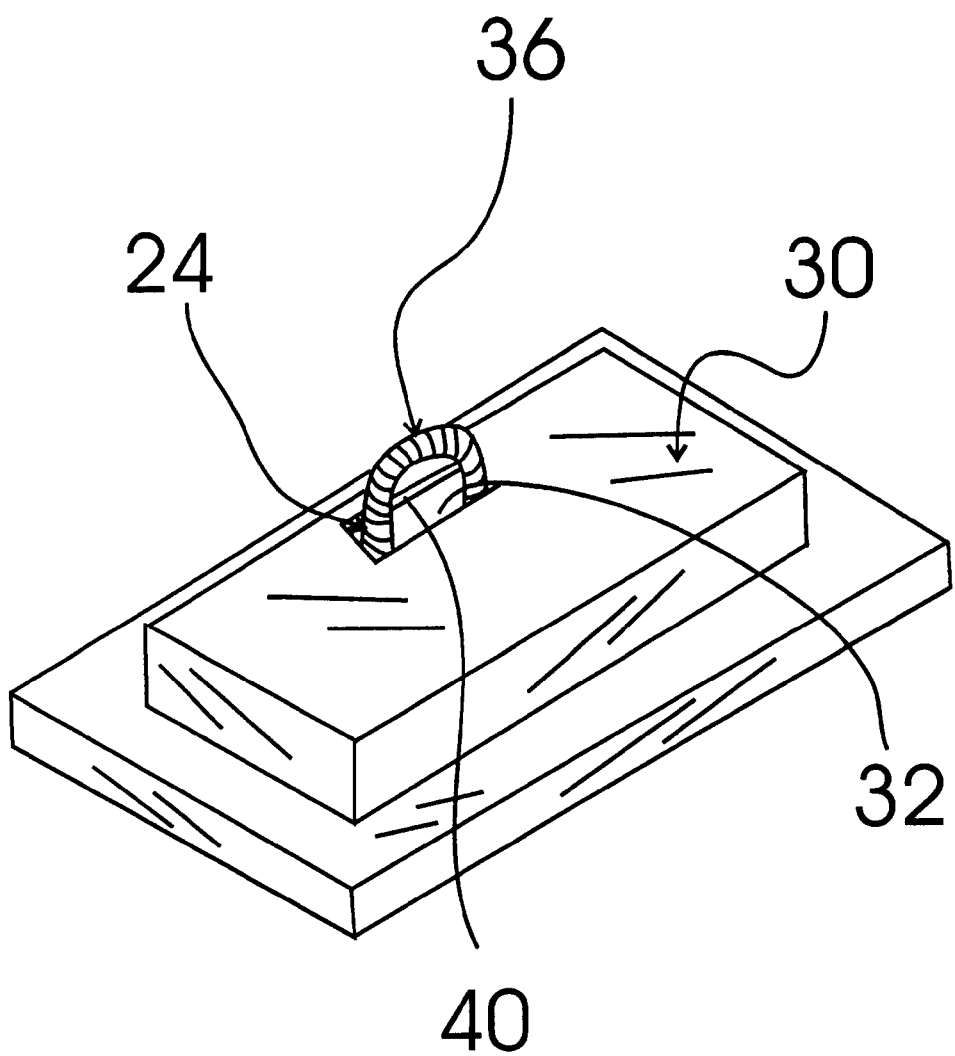
FIG. 2 is a perspective view of the exemplary electric switch plate cover of the present invention showing the hinged cover structure pivoted down over and covering the toggle switch opening and the pair of switch plate cover securing screw apertures of the base plate with the top end of the wire rope loop deformably squeezed through the rope loop passage slot revealing a lock shank opening through which the shank of a padlock of the like can be positioned to lock the hinged cover structure in the down position.

FIG. 1 shows an exemplary embodiment of the electric switch plate cover of the present invention, generally designated 10, positioned above a representative switch plate, generally designated 12, with a conventional on/off toggle switch 14. Electric switch plate cover 10 includes a molded plastic base plate 16 having a central, rectangular shaped, on/off toggle switch opening 18; a pair of switch plate cover securing screw apertures 20a,20b positioned so as to be positioned in registration with the securing screw apertures 22a,22b of representative switch plate 12; a flexible wire rope loop, generally designated 24 extending upward from base plate 16 from a location adjacent to on/off toggle switch opening 18; and a hinged cover structure, generally designated 30 pivotally attached to the top surface of base plate 16 and sized and shaped to pivot down over and cover toggle switch opening 18 and the pair of switch plate cover securing screw apertures 20a,20b of base plate 16. Hinged cover structure 30 is generally box shaped and has a rope loop passage slot 32 formed therethrough that is positioned to be in registration with wire rope loop 24 when hinged cover structure 30 is, referring now to FIG. 2, in the down position. Rope loop passage slot 32 is sized to require the top end 36 of flexible wire rope loop 24 to deformably slip therethrough. Top end 36 extends sufficiently through rope loop passage slot 32 to define a lock shank opening 40 through which the shank of a padlock of the like can be positioned to lock hinged cover structure 30 in the down position.

Figure 3:
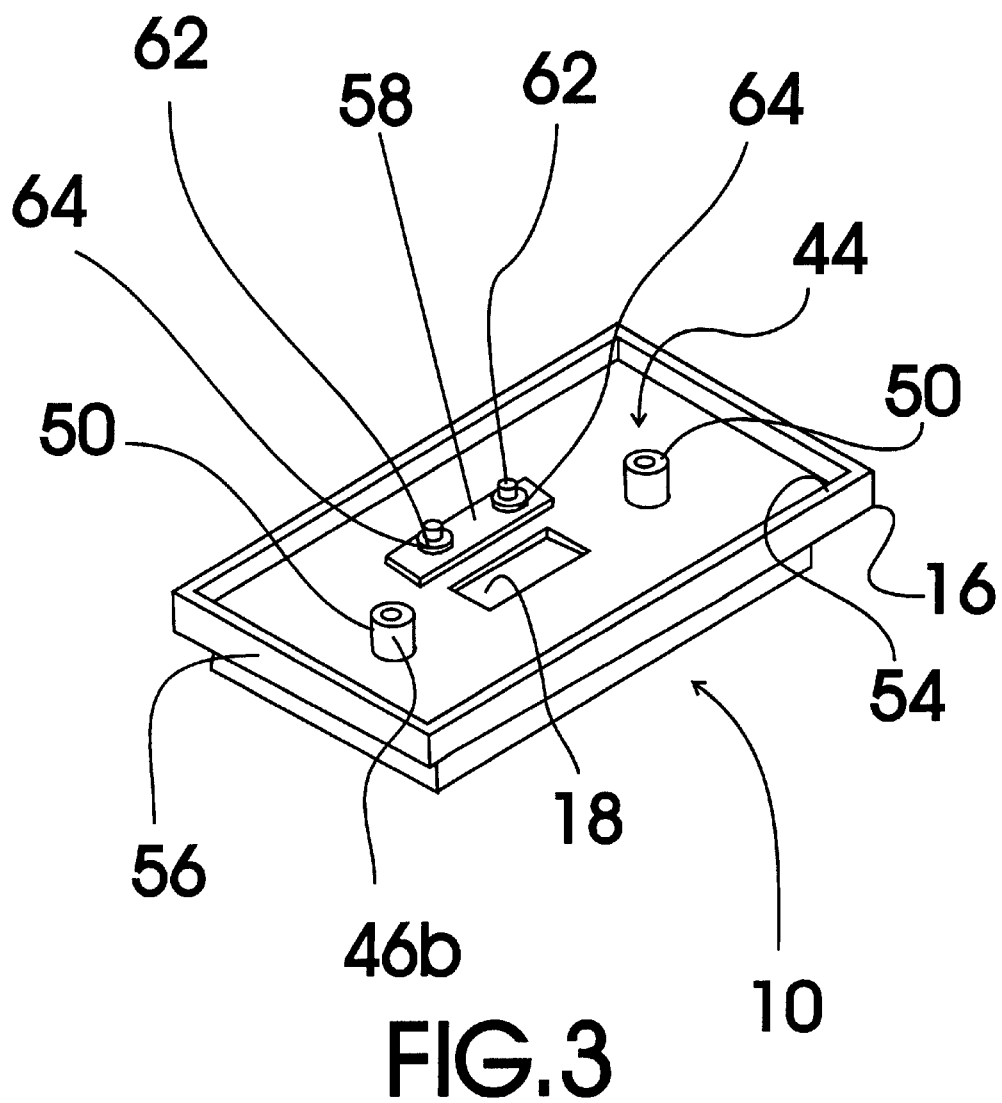
FIG. 3 is an underside perspective view of the exemplary electric switch plate cover of FIG. 1 showing the underside of the base plate including the central, rectangular shaped, on/off toggle switch opening; the pair of switch plate cover securing screw aperture tubes extending downward from the underside surface of the base plate so as to lie in the same plane as the downwardly extending perimeter base plate edge; and the rigid metal attachment plate for the flexible wire rope showing the two terminal ends of the flexible wire rope loop positioned through wire rope end apertures formed through the rigid metal attachment plate and attached with clips secured to the wire rope ends to prevent the wire rope ends from pulling through the wire rope end apertures.

With reference now to FIG. 3, the underside surface, generally designated 44, of electric switch plate cover 10 includes central, rectangular shaped, on/off toggle switch opening 18; a pair of switch plate cover securing screw aperture tubes 46a,46b extending downward from underside surface 44 of base plate 16 so as to each have a terminal tube end 50 lying in the same geometric plane as the bottom surface 54 of the downwardly extending perimeter base plate edge 56. A rigid metal attachment plate 58 is attached to underside surface 44 adjacent to on/off toggle switch opening 18 and has two wire rope end apertures formed therethrough through which terminal ends 62 of flexible wire rope loop 24 (FIG. 1) are positioned. Terminal ends 62 are each provided with a metal clip 64 around the circumference thereof to prevent the terminal ends 62 from passing through rigid metal attachment plate 58.

It can be seen from the preceding description that an electric switch plate cover has been provided that is easily installed over an existing electrical switch plate; that includes a hinged cover structure that can be locked in a position blocking access to the electric toggle switch of the existing electrical switch plate; and that includes a base plate having a central, rectangular shaped, on/off toggle switch opening; a pair of switch plate cover securing screw apertures positioned so as to be positioned in registration with securing screw apertures of the representative switch plate; a flexible wire rope loop extending upward from the base plate from a location adjacent to the on/off toggle switch opening; a hinged cover structure pivotally attached to the top surface of the base plate and sized and shaped to pivot down over and cover the toggle switch opening and the pair of switch plate cover securing screw apertures of the base plate and having a rope loop passage slot positioned to be in registration with the wire rope loop when the hinged cover structure is in the down position and sized such that the top end of the flexible wire rope loop must deform to slip therethrough; the top end of the flexible wire rope loop defining a lock shank opening through which the shank of a padlock of the like can be positioned to lock the hinged cover structure in the down position when the flexible wire rope loop is deformably squeezed through the rope loop passage slot; the base plate having an underside surface defined by a downwardly extending perimeter base plate edge; the underside surface having a pair of switch plate cover securing screw aperture tubes extending downward from the underside surface of the base plate such that the terminal tube ends thereof lie in the same plane as the downwardly extending perimeter base plate edge; the base plate further including a rigid metal attachment plate attached to the underside surface and having two wire rope end apertures formed therethrough through which two terminal ends of the flexible wire rope loop are positioned; the two terminal ends of the flexible wire rope loop each have a clip secured thereto to prevent the wire rope end from pulling through a respective wire rope end aperture.

It is noted that the embodiment of the electric switch plate cover described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An electric switch plate cover comprising:
   a base plate having a central, rectangular shaped, on/off toggle switch opening;
   a pair of switch plate cover securing screw apertures positioned so as to be positioned in registration with a pair of securing screw apertures of the base plate;
   a flexible wire rope loop extending upward from said base plate from a location adjacent to said on/off toggle switch opening;
   a hinged cover structure pivotally attached to a top surface of said base plate and sized and shaped to pivot down over and cover said toggle switch opening and said pair of switch plate cover securing screw apertures of said base plate and having a rope loop passage slot positioned to be in registration with said wire rope loop when said hinged cover structure is in a down position and sized such that a top end of said flexible wire rope loop must deform to slip therethrough;
   said top end of said flexible wire rope loop defining a lock shank opening through which said shank of a padlock of said padlock can be positioned to lock said hinged cover structure in a down position when said flexible wire rope loop is deformably squeezed through said rope loop passage slot;

said base plate having an underside surface defined by an upwardly extending perimeter base plate edge;

said underside surface having a pair of switch plate cover securing screw aperture tubes extending upwardly from said underside surface of said base plate such that terminal tube ends thereof lie in a same plane as said downwardly extending perimeter base plate edge;

said base plate further including a rigid metal attachment plate attached to said underside surface and having two wire rope end apertures formed therethrough through which two terminal ends of said flexible wire rope loop are positioned;

said two terminal ends of said flexible wire rope loop each have a clip secured thereto to prevent a wire rope end from pulling through a respective wire rope end aperture.

* * * * *